(12) United States Patent
Josefsson et al.

(10) Patent No.: US 9,720,874 B2
(45) Date of Patent: Aug. 1, 2017

(54) AUTO-DETECTION AND MODE SWITCHING FOR DIGITAL INTERFACE

(75) Inventors: Olafur M. Josefsson, Hafnarfjordur (IS); Yang Pan, Shanghai (CN)

(73) Assignee: INVENSENSE, INC., San Jose, CA (US)

( * ) Notice: Subject to any disclaimer, the term of this patent is extended or adjusted under 35 U.S.C. 154(b) by 541 days.

(21) Appl. No.: 13/286,388

(22) Filed: Nov. 1, 2011

(65) Prior Publication Data

US 2012/0110218 A1 May 3, 2012

Related U.S. Application Data

(60) Provisional application No. 61/408,834, filed on Nov. 1, 2010.

(51) Int. Cl.
*G06F 3/00* (2006.01)
*G06F 13/42* (2006.01)
*G06F 11/34* (2006.01)
*H04R 1/00* (2006.01)

(52) U.S. Cl.
CPC ...... *G06F 13/4291* (2013.01); *G06F 11/3485* (2013.01); *G06F 2213/0016* (2013.01); *H04R 1/005* (2013.01); *H04R 2410/00* (2013.01); *H04R 2430/01* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 6,219,451 B1 * | 4/2001 | Hunt et al. | 382/214 |
| 7,164,449 B1 * | 1/2007 | White | H04N 5/213 |
| | | | 348/607 |
| 7,433,972 B2 * | 10/2008 | Kou | 710/14 |
| 7,643,849 B2 * | 1/2010 | Lu et al. | 455/556.1 |
| 8,421,517 B2 * | 4/2013 | Marumoto et al. | 327/333 |
| 2002/0137501 A1 * | 9/2002 | Datar et al. | 455/419 |
| 2003/0187662 A1 * | 10/2003 | Wilson | 704/500 |
| 2004/0006584 A1 * | 1/2004 | Vandeweerd | 709/107 |
| 2004/0068535 A1 * | 4/2004 | Subbiah et al. | 709/200 |
| 2005/0204077 A1 * | 9/2005 | Kou | 710/36 |
| 2006/0007614 A1 * | 1/2006 | Pozzuoli et al. | 361/62 |
| 2006/0023121 A1 * | 2/2006 | Obara et al. | 348/554 |
| 2006/0084383 A1 * | 4/2006 | Ibrahim et al. | 455/41.2 |

(Continued)

*Primary Examiner* — Henry Tsai
*Assistant Examiner* — Christopher Bartels
(74) *Attorney, Agent, or Firm* — Maryam Imam; Klintworth & Rozenblat IP LLC (57) ABSTRACT

A method of operating a microphone system includes the steps of monitoring an I/O terminal to detect whether a signal on that terminal achieves a pre-defined logic level during a monitoring period. The I/O terminal and a second I/O terminal are configured to one of a hardware mode or a communications-bus mode depending on whether the pre-defined logic level is detected. A microphone system includes two I/O terminals and an automatic detection and mode switching circuit, as well as a communications bus interface circuit and a hardware control circuit. The mode automatic detection and mode switching circuit couples the two I/O terminals to either the communications bus interface circuit or the hardware control circuit in response to the logic level detected on one of the I/O terminals during a monitoring period.

25 Claims, 7 Drawing Sheets

(56) References Cited

U.S. PATENT DOCUMENTS

| | | | |
|---|---|---|---|
| 2006/0269004 A1* | 11/2006 | Ibrahim et al. | 375/260 |
| 2007/0043881 A1* | 2/2007 | Li | G06F 11/323 710/1 |
| 2007/0239921 A1* | 10/2007 | Toorians et al. | 710/306 |
| 2008/0013747 A1* | 1/2008 | Tran | 381/67 |
| 2008/0090565 A1* | 4/2008 | Kim | H04B 1/202 455/425 |
| 2008/0253085 A1* | 10/2008 | Soffer | 361/687 |
| 2010/0063810 A1* | 3/2010 | Gao | 704/230 |
| 2011/0064246 A1* | 3/2011 | Loeppert et al. | 381/107 |
| 2011/0228864 A1* | 9/2011 | Aryanfar et al. | 375/259 |
| 2012/0137163 A1* | 5/2012 | Sasagawa | 714/3 |

\* cited by examiner

AUTO-DETECTION AND MODE SWITCHING FOR DIGITAL INTERFACE

PRIORITY

This patent application claims priority from provisional U.S. patent application No. 61/408,834, filed Nov. 1, 2010, entitled, "Auto-Detection and Mode Switching for I2C Interface," and naming Olafur Mar Josefsson and Yang Pan as inventors [practitioner's file 2906/130], the disclosure of which is incorporated herein, in its entirety, by reference.

TECHNICAL FIELD

The present invention relates to electronic systems, and more particularly to methods and circuits for managing and operating electronic systems.

BACKGROUND ART

It is known in the prior art how to communicate to and from a circuit using a data bus. Data busses typically adhere to a bus protocol that defines, among other things, the configuration and function of input/output terminals dedicated to implementing the bus protocol. For example, digital-output microphone systems include a digital data output. A number of digital bus protocols, such as the inter-IC sound (or "I2S") bus for example, enable microphone systems to transmit digital output data.

It is also known to program or otherwise control portions of a circuit by using control signals, or via a data bus. For example, some bus protocols have various operating modes that can be programmed or re-programmed to adapt to a given application or operating environment. An example of one such protocol is the "inter-integrated circuit" (or "I2C") bus.

Typically, a circuit includes input/output terminals dedicated to a specific task, such as implementing a data bus or receiving control signals. However, including single-use terminals can be problematic in a small circuit in which there may not be space available to add dedicated terminals. On the other hand, providing multi-tasking terminals typically require considerable overhead in terms of on-board control circuitry and external control programming.

SUMMARY OF THE EMBODIMENTS

In a first embodiment there is provided a method of automatically selecting between a communications-bus mode and a hardware control mode in a microphone system, in which the method includes providing a circuit with a first digital input/output terminal and a second digital input/output terminal; monitoring a signal present on the first digital input/output terminal during a monitoring period of a fixed, pre-determined time, the monitoring period initiated by an initiating event; determining whether the signal present on the first digital input/output terminal achieves a pre-defined logic state during the monitoring period; and configuring the first and second input/output terminals to implement a hardware control mode if the signal on the first digital input/output terminal does not achieve the pre-defined logic state during the monitoring period. In some embodiments, the pre-defined logic state is a logic 1, while in other embodiments the pre-defined logic state is a logic 0.

In some embodiments, the method also includes configuring the first and second input/output terminals in a communications-bus mode in which the terminals implement a communications bus protocol, if the signal on the first digital input/output terminal achieves the pre-defined logic state during the monitoring period.

In some embodiments, the initiating event is the application of power to the circuit.

In yet other embodiments, the system is configured such that a subcomponent of the system may be enabled or disabled in response to a digital signal input on one of the digital input/output terminals when in the hardware control mode. In some embodiments the system is configured such that system may be enabled or disabled in response to a digital signal input on one of the digital input/output terminals when in the hardware control mode.

In some embodiments, the system includes at least one programmable sub-component, the method further comprising programming the sub-components over the communications bus.

In a second embodiment, a microphone system has a digital interface capable of implementing a plurality of interface modes, and the microphone system also includes a circuit having a first digital input/output terminal and a second digital input/output terminal; a monitoring circuit coupled to the first digital input/output, the monitoring circuit including a circuit configured to detect whether a signal present on the first digital input/output terminal achieves a pre-defined logic state during a monitoring period, the monitoring circuit having a monitoring circuit output; a mode selection circuit having an input coupled to the first digital input/output terminal and a second digital input/output terminal, and a selection input coupled to the monitoring circuit output; a communications-bus interface circuit coupled to the mode selection circuit; and a hardware control circuit coupled to the mode selection circuit; wherein the mode selection circuit enables the hardware control circuit if the output of the monitoring circuit output provides a first digital output, and enables the communications-bus interface circuit if the monitoring circuit output provides a second digital output.

In some embodiments, the monitoring circuit is configured to initiate the monitoring period in response to the application of power to the circuit. In some embodiments, the hardware control circuit is coupled to a sub-component of the microphone system, and the hardware control circuit is configured to disable the sub-component in response to a pre-defined digital signal input on one of the digital input/output terminals when the hardware control circuit is enabled.

In some embodiments, the hardware control circuit is configured to disable the system in response to a pre-defined digital signal input on one of the digital input/output terminals when the hardware control circuit is enabled. In some embodiments, when the hardware control circuit is enabled, the hardware control circuit is configured to disable the sub-component in response to a pre-defined digital signal input on one of the digital input/output terminals, and to disable the system in response to a pre-defined digital signal input on the other one of the digital input/output terminals.

In some embodiments, the communications bus interface circuit comprises an interface conforming to the I2C protocol or a derivative of the I2C protocol.

According to another embodiment, a method of operating a circuit having digital communications interface and a memory includes configuring the digital communications interface to a first mode at a first time; maintaining the digital communications interface in the first mode until a second time, the second time being after the first time; evaluating the contents of the memory at the second time;

and configuring the digital communications interface to a second mode if the contents of the register have a pre-defined value at the second time.

In some embodiments, the first mode is a communications bus mode complying with a first bus protocol. In some embodiments, the first mode is a communications bus complying with the I2C protocol.

In some embodiments, the second mode is a hardware control mode.

In some embodiments, the second mode is a second communications bus mode, the second communications bus complying with a second protocol that is distinct from the first bus protocol.

Another embodiment there is provided a microphone system having a digital interface capable of implementing a plurality of interface modes, and the microphone system includes a bus interface circuit configured to implement a communications bus on the digital interface; a second interface circuit configured to implement one of a second communications bus and a hardware control interface on the digital interface; a memory capable of receiving, storing, and overwriting a word of digital data; an evaluation circuit configured to compare a word of data stored in the register against a pre-defined reference word of digital data; a timer circuit with an output coupled to the evaluation circuit, and configured to trigger the evaluation circuit after a pre-determined amount of time after an initiating event; and a mode selection circuit configured to couple one of the bus interface circuit and the second interface circuit to the digital interface as a result of the comparison performed by the evaluation circuit.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Some embodiments provide a dynamically configurable digital data interface that provides flexibility to a system designer, while not requiring costly overhead in terms of dedicated input/output terminals or on-board circuitry. A digital communications interface can be used for one purpose, and then quickly and easily be re-configured for a second purpose. For example, the digital communications interface may initially be configured as a bus interface that may be used to program elements of a circuit, and then be re-configured as a control interface to allow the circuit to be controlled while in operation, or a different bus interface.

Figure 1:
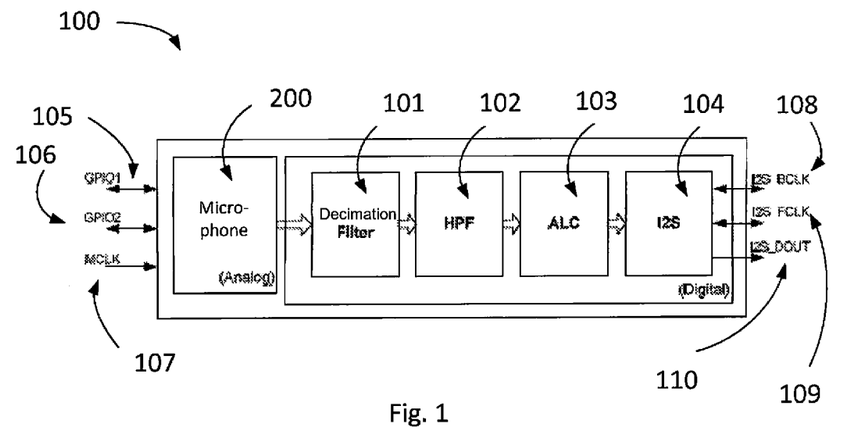
FIG. 1 schematically illustrates a circuit having a dynamically configurable digital interface.
Figure 2:
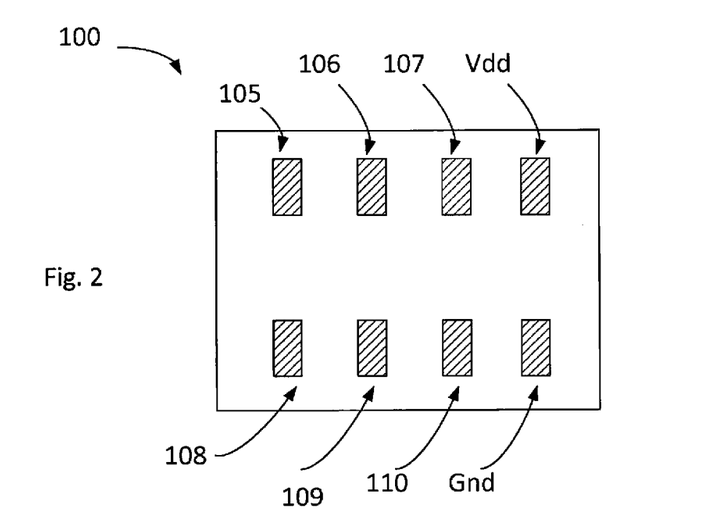
FIG. 2 schematically illustrates a plan view of an embodiment of the circuit of FIG. 1.

A first embodiment is schematically illustrated by microphone system 100 in FIG. 1, and a plan view of the terminals of system 100 is schematically illustrated in FIG. 2. It should be noted, however, that the dynamically reconfigurable interface is not limited to use with microphone systems.

The microphone system 100 includes a microphone element 200 that changes impinging audio energy to an analog electrical signal. Some microphone systems digitize the microphone's analog output to provide the opportunity to process the signal in the digital domain before transmitting it as a digital output from the microphone system 100. Indeed, the microphone system 100 also includes several other sub-components, such as an analog to digital converter (which, in this case, is within the microphone block 200) to convert the output of microphone 200 to a digital signal, a decimation filter 101, as well as a high-pass filter 102 ("HPF"), among others.

The microphone element 200 and other system sub-components typically require a source of power (Vdd) and a connection to electrical ground (Gnd), here represented by the Vdd and Gnd terminals schematically illustrated in FIG. 2.

One or more of the sub-components may be programmable, or otherwise controllable, and therefore require connection to programming and control terminals on the system 100. For example, in this embodiment the HPF 102 is followed by an automatic level control ("ALC") circuit 103. The ALC circuit 103 provides continuous adjustment of the signal level in response to the RMS amplitude of the input signal, and may operate in a variety of modes with a variety of programmable parameters. For example, if the RMS value of the signal is above a reference level (the "peak" level), the ALC circuit 103 lowers the gain of the system to keep this signal below a pre-defined maximum level. When the signal level is below that level, the ALC circuit 103 attempts to maintain a constant signal level (the "target" level) by increasing or decreasing the gain of the system. The target level and/or the peak level may be set by loading data into a register in the ALC circuit 103. Other programmable parameters of the ALC circuit 103 include the ALC maximum gain, and the average time taken for the RMS value estimation, to name but a few. These parameters are also set by loading data into a register in the ALC circuit 103.

In addition to its variety of operating modes and parameters, the ALC circuit 103 may also be disabled, put into a stand-by mode, or shut down, for example to reduce the power consumption of the system 100.

The system 100 of FIG. 1 also includes an I2S bus interface 104. The I2S bus interface 104 is the system output and operates in accordance with the I2S protocol. Because that protocol provides various modes of operation, the I2S interface 104 is programmable to implement any of those protocol variations.

As such, the indicated programming and control of the microphone system 100 is available to a host system (i.e., a larger system of which microphone system 100 is a part) via the input/outputs terminals 105 and 106, in conjunction with clock terminal 107, and the digitized microphone output is available to the host system via a digital I2S bus on terminals 108, 109 and 110. As shown in FIG. 2, the surface area for terminal array is fully utilized, and there is very little room, or in some embodiments no room, to add additional terminals without enlarging the system's size and footprint. In FIG. 1 and FIG. 2, the microphone system 100 is schematically illustrated in a single package, and may even be on a single semiconductor die. However, other embodiments may distribute the elements of microphone system 100 across one or more die. For example, the microphone element 200 may be on one die, and the digital circuitry on another die, such as an ASIC. In such an embodiment, the device schematically illustrated in FIG. 2 may include such a digital circuit (e.g., the ASIC) and a microphone element in an eight-terminal package.

Figure 3:
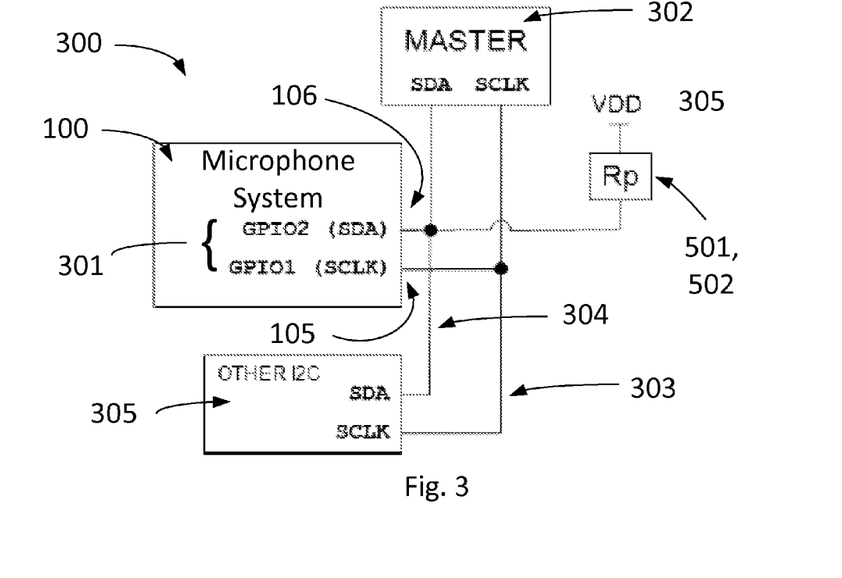
FIG. 3 schematically illustrates a bus interface among components of a host system.
Figure 4:
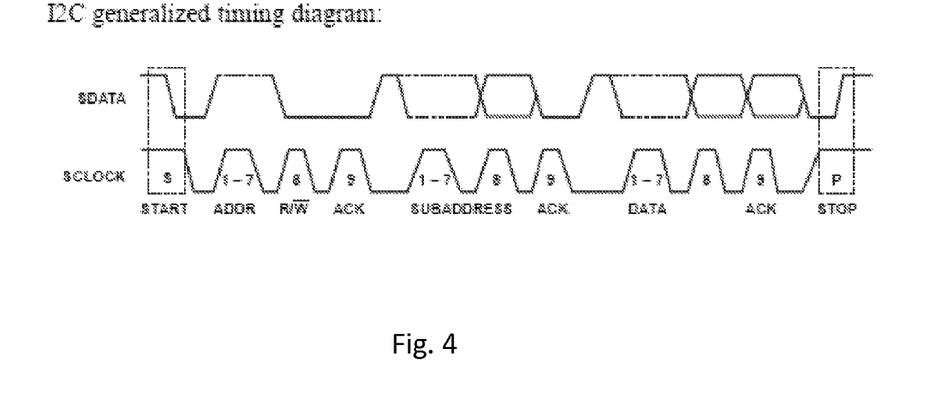
FIG. 4 schematically illustrates a timing diagram of an I2C bus interface.
Figure 5:
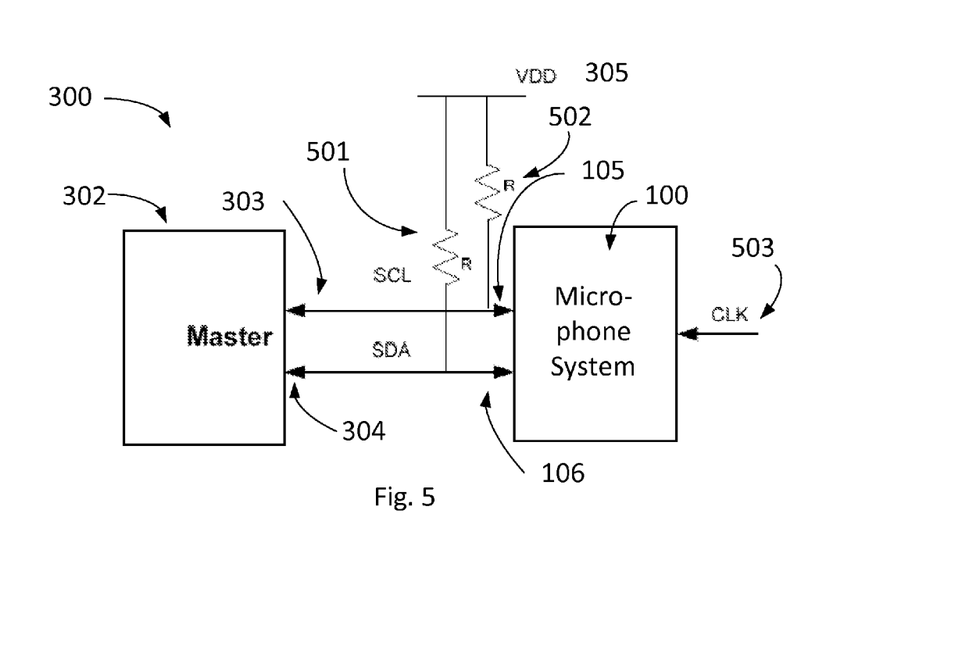
FIG. 5 schematically illustrates another view of a bus interface among components of a host system.
Figure 6:
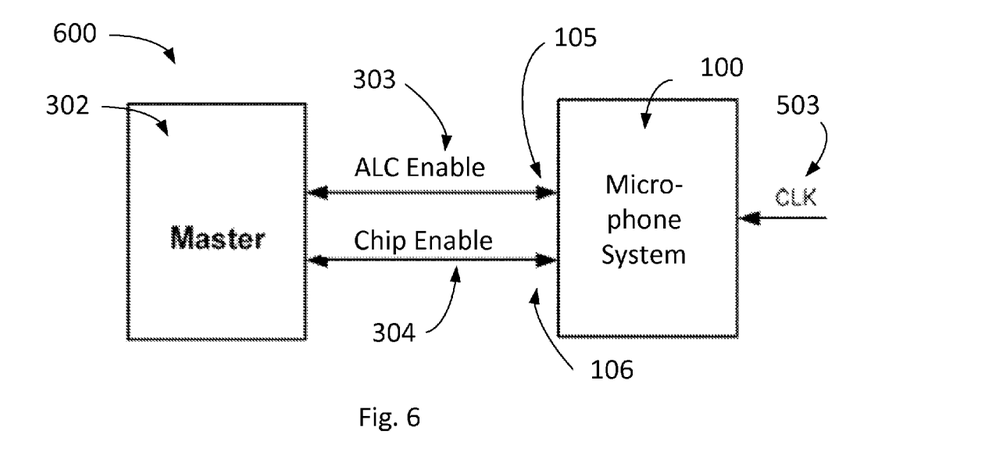
FIG. 6 schematically illustrates a control interface between a controller and a system.

Accordingly, terminals 105 and 106 are dynamically configurable (or re-configurable) into two modes, to implement two functions: an I2C bus 301 to interface to a host system 300, as schematically in FIGS. 3, 4 and 5, and a digital control interface 600 as schematically illustrated in FIG. 6.

To illustrate the first mode, an I2C interface 300 interconnects the microphone system 100, as well as a master controller 302 coupled to the two I2C signaling lines 303 and 304. Those lines connect to terminals 105 and 106 of microphone system 100, and may also connect to an I2C interface on one or more other devices 305. In FIG. 3, these terminals are designated as "GPIO1" and "GPIO2," and are further designated as "SCLK" (sometimes illustrated as "SCL" or "SCLOCK") and "SDA" (sometimes illustrated as "SDATA") respectively, to identify their respective signals in the terms defined by the I2C protocol.

In compliance with the I2C protocol, the signal lines 303 and 304 are coupled to a voltage ("VDD") 305 through pull-up resistors 501 and 502. This pull-up circuit ensures that the signal lines will be at a logic high (or logic 1) value when not driven low by one of the I2C interfaces in the system, as per the I2C protocol.

The controller 302 controls this communications network, and each I2C interface transmits and/or receives data by controlling the data on the signal lines 303 and 304. A generalize timing diagram of an I2C interface in operation is schematically illustrated in FIG. 4.

Another view of system 300 is schematically illustrated in FIG. 5, which shows in more detail the pull-up resistors 501 and 502, as well as a clock input 503 (designated "CLK") to the microphone system 100. The clock signal on the clock input operates to provide timing to the I2C bus system.

To illustrate the second mode, a control interface 600 couples the controller 302 and microphone system 100, as schematically illustrated in FIG. 6. In this mode, the controller 302 may assert two signals on lines 303 and 304, respectively. One is designated "ALC enable," and controls the ALC circuit 103. If ALC enable signal is logic 1, the ALC circuit 103 is enabled, but if the signal is logic 0, the ALC circuit 103 is disabled. Of course, logic states discussed herein are illustrative only, and generally could be used in complementary form. For example, the system could be implemented such that ALC circuit 103 is enabled when the ALC enable signal is a logic 0, and disabled when the signal is a logic 1.

The other master controller signal is designated as the "Chip enable" signal. If Chip enable signal is logic 1, the entire system 100 (or a pre-defined subset of the system sub-components) is enabled, but if the signal is a logic 0, the system (or pre-defined subset) is disabled.

As discussed above, the system 100 configures a single digital interface (i.e., in this case "GPIO1" and "GPIO2") in a number of ways to serve diverse roles. In one configuration, they may serve (along with the clock signal) to implement a bus protocol such as I2C. For reference, this may be known as "I2C mode" or "communications bus" mode. In another configuration, they may act as pins to receive control signals to enable or disable sub-components of the system 100. For reference, this may be known as "hardware mode." Of course, the two modes could encompass any variety of options, such as two different communications bus interfaces, for example.

To accommodate this flexibility, the system 100 includes circuitry to select one of the modes of operation. Such circuits may include digital circuit, software, or a combination of digital circuits and software. In some embodiments, the some of the circuitry may even be analog circuitry.

Figure 7:
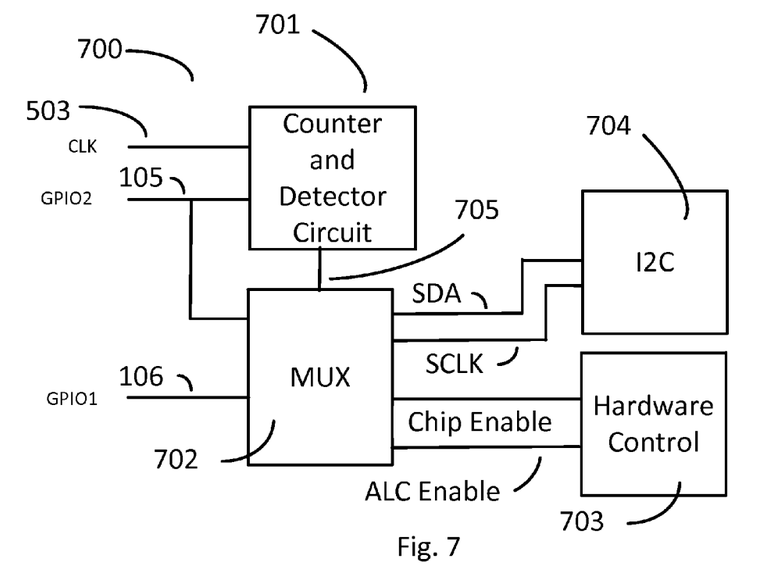
FIG. 7 schematically illustrates an embodiment of mode selection circuitry.

One embodiment 700 of such circuitry is schematically illustrated in FIG. 7. The circuit includes a counter and detector circuit 701. The counter and detector circuit 701 has, as inputs, the clock 503 and one of the GPIO signals (in this case, GPIO2). This process may be known as a "mode selection event," and may be initiated in a variety of ways, such as the receipt of power at the time the system 100 is powered-up, or when the system 100 first receives a clock signal on a clock input, to name but a few. Alternately, a mode selection event could be triggered by an internally generated or externally generated control signal.

The counter and detector circuit 701 counts a number of clock cycles from an initiation event to define a detection interval (which may also be known as a detection window or monitoring period), and monitors the signal in the GPIO terminal 106. The detection interval may be a pre-determined, fixed period of time. Also, although the counter and detector 701 in this embodiment operates by counting clock cycles, other embodiments may count the passage of time in different ways, such as with an timing circuit, or even an RC circuit that measures the passage of time by the charging of a capacitor, for example. Further, some or all of the counter and detector circuitry may be on a semiconductor substrate along with other portions of the system 700, or may be separate from those other portions.

If the signal in the GPIO remains at logic 0 during the interval between the initiation event and the pre-determined number of clock cycles, then the circuitry configures the GPIO pins 105 and 106 into the hardware mode. Otherwise, if the signal in the GPIO terminal achieve a logic 1 state at any point during the interval, the circuit configures the GPIO pins 105 and 106 into the I2C mode. The logic state of the signal on the GPIO terminal 106 during the detection interval may be determined by the system's master controller.

Figure 8:
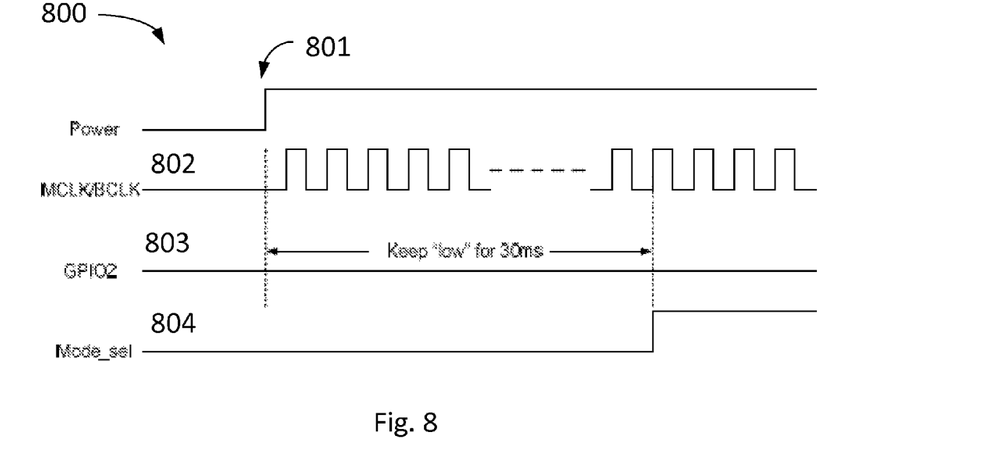
FIG. 8 schematically illustrates a timing diagram of an embodiment of a mode selection circuit.

An embodiment of the timing 800 of a mode selection into the hardware mode is presented in FIG. 8. In this example, the initiating event is the application of power 801 to the microphone system, but the process may be initiated by other events as well, such as user-controlled events, for example. A counter in the counter and detector circuit 701 counts the clock pulses 802 (designated "MCLK/BCLK" in FIG. 8). In this example, the counter counts the clock cycles for an interval of 30 ms. As such, the interval can be defined as a length of time, or a number of clock cycles. The amount of time or number of clock cycles can be set to meet the requirements of the system. For example, the time could be defined as 10 ms, 27 ms or any other temporal duration, or an equivalent number of clock cycles at a known clock frequency. The counter may be implemented in digital logic in ways within the skills of persons of ordinary skill in the art.

If the digital signal on GPIO2 terminal 803 stays low for the duration of the interval, the mode select signal 804 ("Mode_sel") transitions to a logic 1. The mode select signal 705 is output from the counter and detector circuit 701 to a multiplexer circuit 702. When the mode select signal is logic 1, the multiplexer 702 couples the GPIO signals to a hardware control circuit 703. The hardware control circuit 703 processes the ALC enable and Chip enable signals from the GPIO terminals to enable or disable portions of the microphone system 100, as discussed above. In alternate embodiments, the ALC enable and Chip enable signals are provided directly from the GPIO terminals to the system 100 or its individual sub-components.

When the mode select signal is logic 1, the multiplexer 702 couples the GPIO signals to an I2C interface circuit 704. The I2C circuits 704 processes the signals to and from the GPIO terminals 105 and 106 to implement the I2C protocol.

Figure 9:
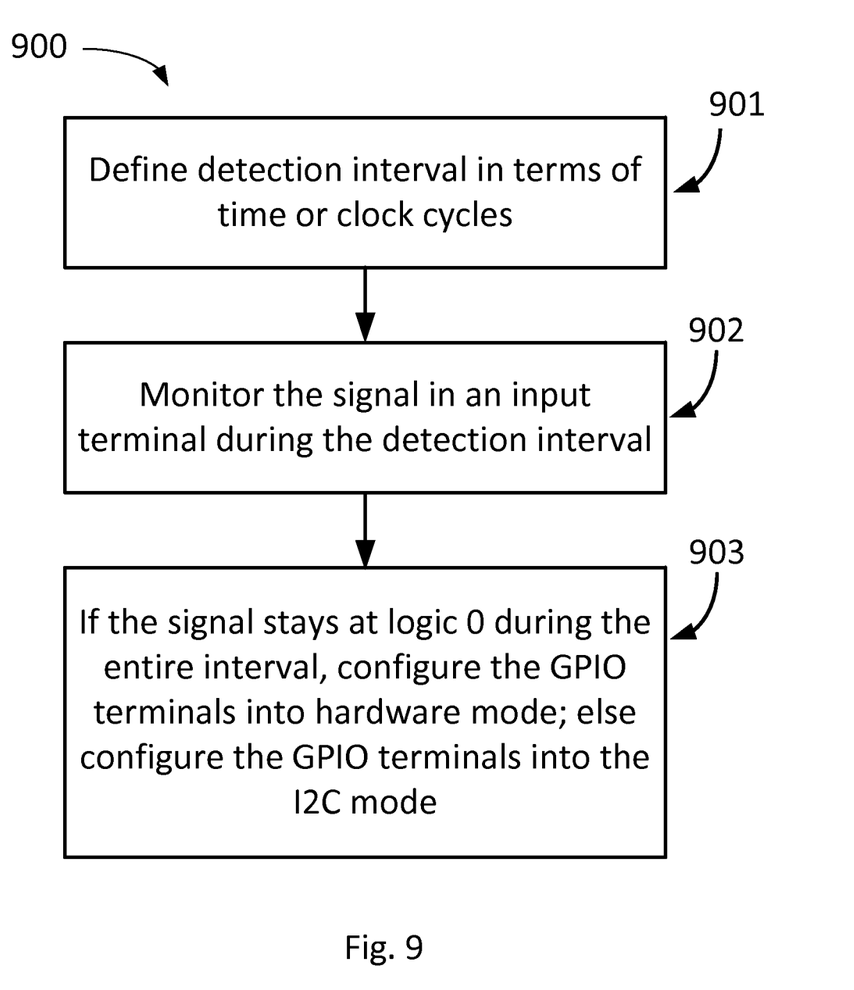
FIG. 9 schematically illustrates a method of operation of the mode selection circuitry of FIG. 7.

FIG. 9 schematically illustrates a method 900 of implementing detection and mode selection as described above. The process begins at step 901 by establishing the detection interval for a circuit having a first digital input/output terminal and a second digital input/output terminal. As noted above, the interval may be defined as a fixed time, or a number of cycles. In either case, the detection interval may be measured, among other ways, by counting the number of cycles of the input clock, where the clock frequency is known. The detection interval, and the method used to measure the interval, may be determined and fixed when the microphone system is designed, fabricated or deployed. If the time interval is measured by counting clock cycles, the interval may be adjusted by reprogramming the counting circuit.

Next, the detection interval is measured at step 902, beginning from an initiation event. The initiation event may be the application of power to the system, as illustrated in FIG. 7, but other events, even including events under the control of the operator, may also serve as the initiation event.

Step 902 also involves monitoring the input signal terminal (such as the GPIO2 signal as illustrated In FIG. 7 and FIG. 8), to determine whether it achieves a level of logic 1 during the detection interval, as discussed above. Accordingly, the detection interval may be known as a "monitoring period."

At the conclusion of the interval, the system configures the GPIO terminals to be in one of hardware or mode or I2C mode (step 903). Once the GPIO terminals are configured, the process is complete.

Of course, there may be variations on these illustrative embodiments. For example, if the monitored signal achieves a level of logic 1 before the interval is complete, the circuit may configure the GPIO terminals without waiting for the passage of the remainder of the interval. As mentioned above, logic states described above may be implemented in their complementary forms. Also, the monitored GPIO terminal may be GPIO1 instead of GPIO2.

Figure 10:
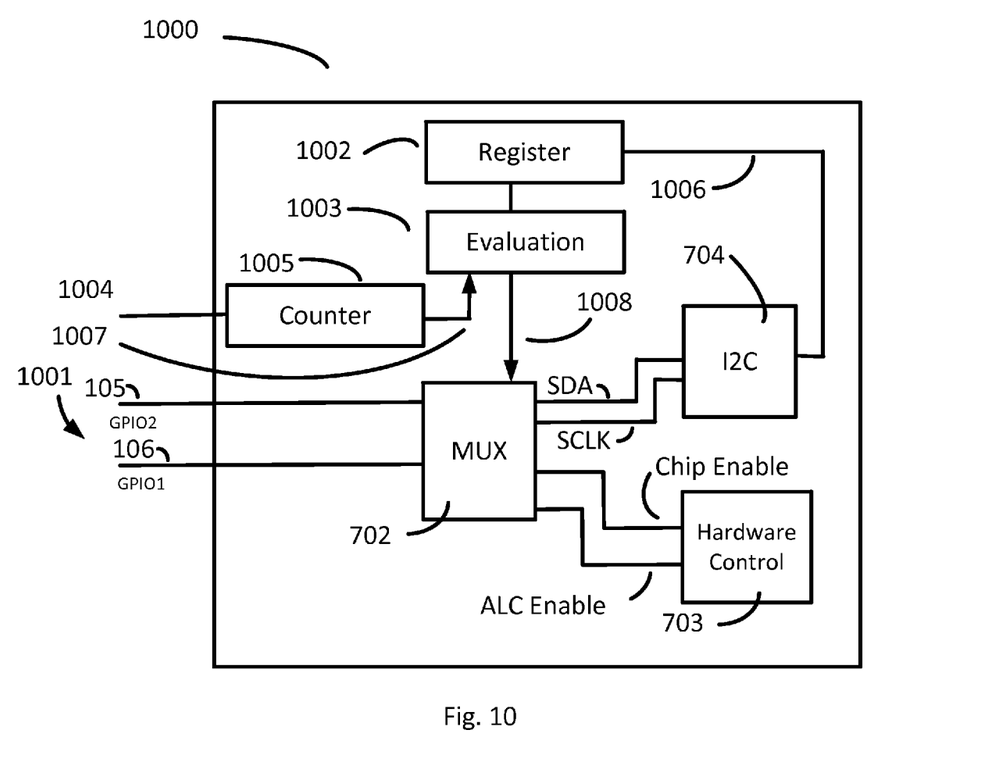
FIG. 10 schematically illustrates another embodiment of mode selection circuitry.

An alternate embodiment is schematically illustrated in FIG. 10, in which a circuit 1000 includes a digital communications interface 1001 and a register 1002 capable of receiving and storing digital data. The register 1002 may be a digital register dedicated to this purpose, or may be a part of a general purpose memory. The circuit 1000 also contains other elements as described above in connection with FIG. 7, and which will not be described again here.

Figure 11:
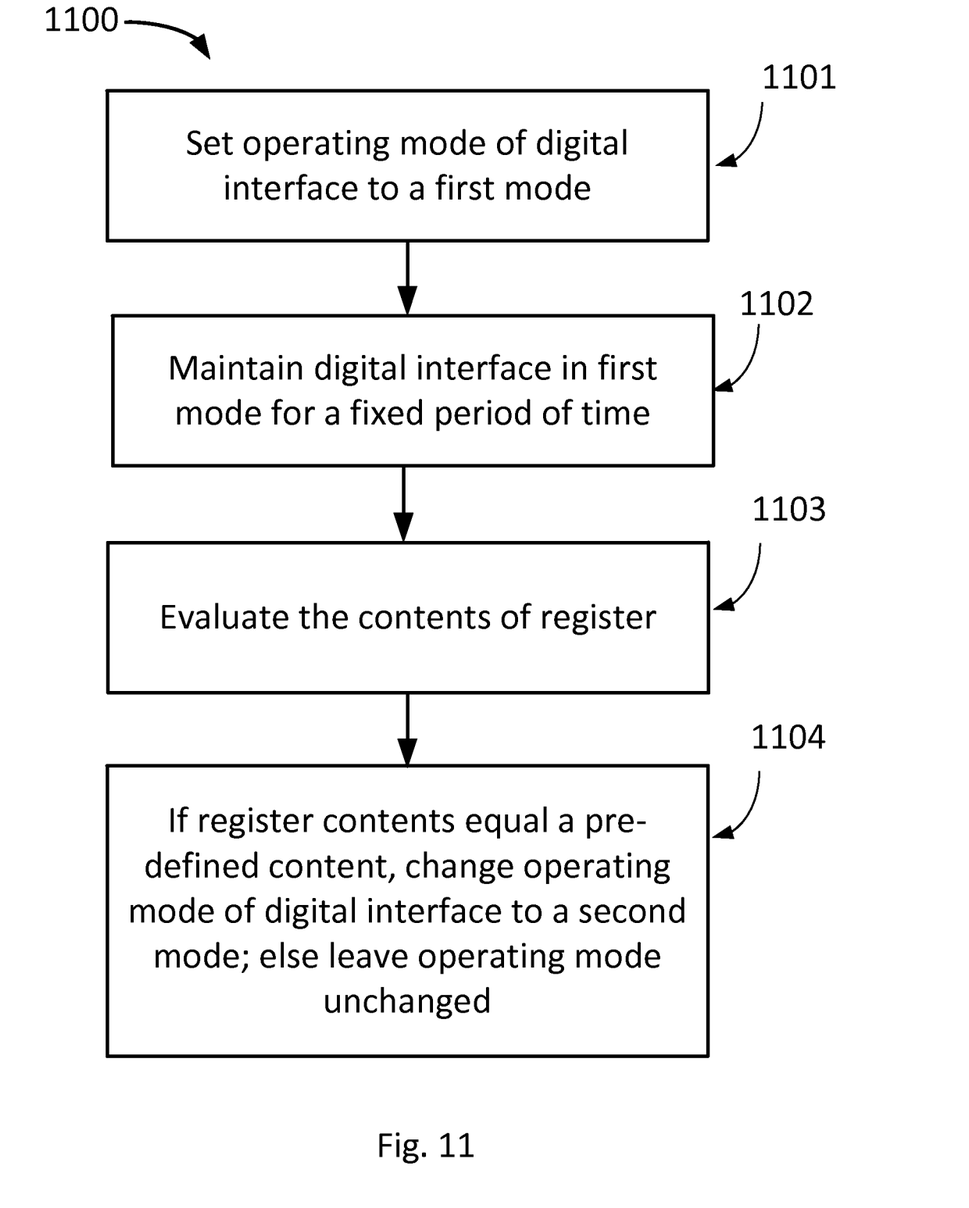
FIG. 11 schematically illustrates a method of operation of the mode selection circuitry of FIG. 10.

The operating mode of the digital communications interface 1001 is dynamically configurable (or re-configurable) based, in part, on the content of the register 1002, or on a change in the content of the register 1002. A method of operation of the circuit 1000 is schematically illustrated in FIG. 11 and will be described below in connection with FIG. 10.

In one embodiment of operation, a mode selection event causes the operating mode of the digital communications interface 1001 to be set to a first mode at step 1101. In some embodiments, the first mode may be a default mode, and/or may implement a bus communications protocol, such as the I2C protocol. A mode selection event may be triggered in a variety of ways, such as the receipt of power at the time the integrated circuit 1000 powered-up, or when the integrated circuit 1000 first receives a clock signal on a clock input 1004, to name but a few. Alternately, a mode selection event could be triggered by an internally generated or externally generated control signal.

The digital communications interface 1001 then remains in that first mode for a fixed period of time or a fixed number of clock cycles at step 1102. The fixed period of time, or number of clock cycles, is generally measured from the initiation of the mode selection event. For example, the number of clock cycles may be counted by a counter 1005, or the time may be measured by any of a variety of timing circuits. Of course, if the clock cycles are periodic, then a fixed number of clock cycles is equivalent to a fixed period of time, and for ease of reference, the following description will refer to a fixed period of time.

When the fixed period of time has passed, an output 1007 from the timing circuit (e.g., counter 1005) triggers a comparison circuit 1003 to evaluate the contents of the register 1002 at step 1103, to determine whether those contents match a pre-determined digital word.

Then, the operating mode of the digital communications interface 1001 is determined by the results of that evaluation. In the embodiment of FIG. 10, an output 1008 of evaluation circuit 1003 controls multiplexer 702 to selectively couple the terminals 106 and 106 to either the I2C circuit 704 or to the hardware control circuitry 703.

In some embodiments, the operating mode of the digital communications interface 1001 may be changed to a second mode based on the contents of the register 1002, at step 1104. For example, in some embodiments if the contents of the register 1002 is a pre-determined digital word, the operating mode of the digital communications interface 1001 is set to a second operating mode; otherwise the operating mode of the digital communications interface 1001 does not change as a result of the evaluation.

In other embodiments, if the contents of the register 1002 has changed since a previous evaluation, then the operating mode of the digital communications interface 1001 is set to a pre-determined mode (e.g., to a second mode, or back to the first mode), and otherwise the operating mode of the digital communications interface 1001 does not change as the result of the evaluation.

The operating mode of the digital communications interface 1001 in some embodiments may initially be set to implement a communications protocol, such as an I2C interface for example, by coupling the digital communications interface 1001 to a bus interface circuit 704. In the embodiment of FIG. 10, the digital communications interface 1000 is also coupled to the register 1002 by an internal bus 1006, and may thereby write data to the register 1002. As such, data arriving at circuit 1000 on the digital communications interface 1001 (e.g., during a time when the digital interface is in a bus mode) may be define the contents of the register 1002, and therefore ultimately define the operating mode of the digital communications interface 1001. In alternate embodiments, a component of the circuit 1000 may write data to the register 1002, and therefore ultimately define the operating mode of the digital communications interface 1001.

Accordingly, various embodiments allow a digital interface in an electronic system to be configured and reconfigured into a variety of modes as the electronic system operates. For example, the digital interface may be configured to any one of a variety of control modes or communications bus modes using a small amount of circuitry within the electronic system.

The electronic system may be implemented on a single integrated circuit, or distributed across two or more circuits.

The embodiments of the invention described above are intended to be merely exemplary; numerous variations and modifications will be apparent to those skilled in the art. All such variations and modifications are intended to be within the scope of the present invention as defined in any appended claims.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a non-transitory tangible medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

What is claimed is:

1. A method of controlling a microphone system, the method comprising:
    directly monitoring a signal present on a first digital input/output terminal during a monitoring period of a fixed, pre-determined time, the monitoring period initiated by an initiating event;
    after detecting the presence of the signal on the directly monitored first digital input/output terminal, determining whether the signal present on the directly monitored first digital input/output terminal achieves a pre-defined logic state during the monitoring period;
    automatically selecting between a communications-bus mode and a hardware control mode by directly configuring the first input/output and a second digital input/output terminal to implement a hardware control mode if the signal on the directly monitored first digital input/output terminal does not achieve the pre-defined logic state during the monitoring period and to implement a communications-bus mode if the signal on the directly monitored first digital input/output terminal does achieve the pre-defined logic state during the monitoring period; and
    re-using the directly monitored first and second digital input/output terminals to implement the hardware control mode and the communication-bus mode, wherein each of the first and second digital input/output terminals is a single pin.

2. A method of controlling a microphone system, according to claim 1, the method further comprising configuring the first and second input/output terminals in a communications-bus mode in which the terminals implement a communications bus protocol, if the signal on the first digital input/output terminal achieves the pre-defined logic state during the monitoring period.

3. A method of controlling a microphone system, according to claim 2, wherein the system further comprises at least one programmable sub-component, the method further comprising programming the sub-components over the communications bus.

4. A method of controlling a microphone system, according to claim 1, wherein the initiating event is the application of power to the circuit.

5. A method of controlling a microphone system, according to claim 1, wherein a subcomponent of the system may be enabled or disabled in response to a digital signal input on one of the digital input/output terminals when in the hardware control mode.

6. A method of controlling a microphone system, according to claim 1, wherein the system may be enabled or disabled in response to a digital signal input on one of the digital input/output terminals when in the hardware control mode.

7. A microphone system having a digital interface capable of implementing a plurality of interface modes, the microphone system comprising:
    a circuit comprising a first digital input/output terminal and a second digital input/output terminal, wherein each of the first and second digital input/output terminals is a distinct pin;
    a monitoring circuit coupled to the first digital input/output, the monitoring circuit comprising a circuit configured to directly monitor the first digital input/output terminal and to detect whether a signal present on the first digital input/output terminal achieves a pre-defined logic state during a monitoring period, the monitoring circuit having a monitoring circuit output, the monitoring circuit operable to determine whether the signal present on the first digital input/output terminal achieves a pre-defined logic state during the monitoring period;
    a mode selection circuit having an input coupled to the first digital input/output terminal and the second digital input/output terminal, and a selection input coupled to the monitoring circuit output;
a communications-bus interface circuit coupled to the mode selection circuit; and
a hardware control circuit coupled to the mode selection circuit,
wherein after the mode selection circuit determines that the signal achieves the pre-defined logic state, the mode selection circuit being operable to automatically enable a hardware control circuit by configuring the first and second input/output terminals to implement a hardware control mode if the signal on the first digital input/output terminal does not achieve the pre-defined logic state during the monitoring period and to enables the communications-bus interface circuit if the signal on the first digital input/output terminal does achieve the pre-defined logic state during the monitoring period;
further wherein the first and second digital input/output terminals are re-used to implement the hardware control mode and the communication-bus mode.

8. A microphone system according to claim 7, wherein the monitoring circuit is configured to initiate the monitoring period in response to the application of power to the circuit.

9. A microphone system according to claim 7, wherein the hardware control circuit is coupled to a sub-component of the microphone system, wherein the hardware control circuit is configured to disable the sub-component in response to a pre-defined digital signal input on one of the digital input/output terminals when the hardware control circuit is enabled.

10. A microphone system according to claim 7, wherein the hardware control circuit is configured to disable the system in response to a pre-defined digital signal input on one of the digital input/output terminals when the hardware control circuit is enabled.

11. A microphone system according to claim 7, wherein when the hardware control circuit is enabled the hardware control circuit is configured to disable the sub-component in response to a pre-defined digital signal input on one of the digital input/output terminals, and to disable the system in response to a pre-defined digital signal input on the other one of the digital input/output terminals.

12. A microphone system according to claim 7, wherein the communications bus interface circuit comprises an interface conforming to the I2C protocol or a derivative of the I2C protocol.

13. A method of operating a circuit, within a microphone system, having digital communications interface and a memory, the method comprising:
determining whether a signal present on a first digital input/output terminal achieves a pre-defined logic state during a monitoring period;
after determining that the signal achieves the pre-defined logic state, automatically selecting between a first mode and a second mode by directly configuring the first and second input/output terminals to implement the first mode if the signal on the first digital input/output terminal does not achieve the pre-defined logic state during the monitoring period and to implement the second mode if the signal on the first digital input/output terminal does achieve the pre-defined logic state during the monitoring period;
selectively configuring the digital communications interface to a first mode at a first time;
maintaining the digital communications interface in the first mode until a second time, the second time being after the first time;
evaluating the contents of the memory at the second time;
selectively configuring the digital communications interface of the microphone system to the second mode if the contents of the register have a pre-defined value at the second time;
re-using the first and second digital input/output terminals to implement the hardware control mode and the communication-bus mode,
wherein each of the first and second digital input/output terminals is a distinct pin.

14. The method of claim 13 wherein the first mode is a communications bus mode complying with a first bus protocol.

15. The method of claim 14, wherein the first mode is a communications bus complying with the I2C protocol.

16. The method of claim 13, wherein the second mode is a hardware control mode.

17. The method of claim 13, wherein the second mode is a second communications bus mode, the second communications bus complying with a second protocol that is distinct from the first bus protocol.

18. A microphone system having a digital interface capable of implementing a plurality of interface modes, the microphone system comprising:
a bus interface circuit configured to implement a communications bus on the digital interface;
a second interface circuit configured to implement one of a second communications bus and a hardware control interface on the digital interface based on a pre-defined logic state of a signal;
a memory capable of receiving, storing, and overwriting a word of digital data;
an evaluation circuit configured to compare a word of data stored in the memory against a pre-defined reference word of digital data;
a timer circuit with an output coupled to the evaluation circuit, and configured to trigger the evaluation circuit after a pre-determined amount of time after an initiating event; and
a mode selection circuit configured to determine whether or not the signal achieves the pre-defined logic state and after the determination, if the signal achieves the pre-defined logic state, the mode selection circuit being operable to selectively couple one of the bus interface circuit and the second interface circuit to the digital interface based on a result of the comparison performed by the evaluation circuit and further being operable to automatically enable a hardware control circuit by configuring the first and second input/output terminals to implement a hardware control mode and if the signal does not achieve the pre-defined logic state, the mode selection circuit being operable to select a communications-bus mode,
wherein the first and second digital input/output terminals are re-used to implement the hardware control mode and the communication-bus mode,
further wherein each of the first and second digital input/output terminals is a distinct pin.

19. The method of automatically selecting between a communications-bus mode and a hardware control mode according to claim 1, further including continuously adjusting a signal level in response to the RMS amplitude of the signal using an automatic level control ("ALC") circuit.

20. The method of automatically selecting between a communications-bus mode and a hardware control mode according to claim 19, wherein if the RMS value of the signal is above a reference level, the ALC circuit lowering a gain of the microphone system to keep the signal below a pre-defined maximum level.

21. The method of automatically selecting between a communications-bus mode and a hardware control mode according to claim 19, wherein the pre-defined logical state is "1" or "0".

22. The method of automatically selecting between a communications-bus mode and a hardware control mode according to claim 19, wherein the ALC allows for operation in in a variety of modes with a variety of programmable parameters.

23. The method of automatically selecting between a communications-bus mode and a hardware control mode according to claim 22, further including loading the programmable parameters into a register in the ALC circuit.

24. The method of automatically selecting between a communications-bus mode and a hardware control mode according to claim 22, wherein when the signal level is below a predetermined level, the ALC circuit attempting to maintain a constant signal level (the "target" level) by increasing or decreasing a gain of the microphone system.

25. The method of automatically selecting between a communications-bus mode and a hardware control mode according to claim 24, further including setting the target level and/or a peak level by loading data into a register in the ALC circuit.

* * * * *